Jan. 19, 1965 E. V. SIRUGUE 3,166,225
FEED CONTROL DEVICE, NOTABLY FOR PUNCHING MACHINE
Filed Sept. 11, 1961 4 Sheets-Sheet 1

Jan. 19, 1965  E. V. SIRUGUE  3,166,225
FEED CONTROL DEVICE, NOTABLY FOR PUNCHING MACHINE
Filed Sept. 11, 1961  4 Sheets-Sheet 3

United States Patent Office 3,166,225
Patented Jan. 19, 1965

3,166,225
FEED CONTROL DEVICE, NOTABLY FOR
PUNCHING MACHINE
Edouard Victor Sirugue, Paris, France, assignor to Etablissements Sirugue & Cie, Société à Responsabilité Limitée, Saint-Ouen, France
Filed Sept. 11, 1961, Ser. No. 137,407
Claims priority, application France, Sept. 9, 1960,
838,172, Patent 1,232,941
2 Claims. (Cl. 226—9)

The present invention relates to a device for controlling the feed of parts to be machined, notably in punching machines, drilling or boring machines, welding machines and the like, as well as in any machine performing operations at well-defined space intervals on parts of generally elongated configuration. Automatic machines are already known, notably in the technique of section-iron punching processes, which comprise a movable carriage on which the sections are caused to travel past the punching device or station, the carriage being stopped automatically at the different punching stations under the control of riders disposed longitudinally on a table carrying a graduated scale at spaced intervals corresponding to the relative spacing of the different holes to be punched. Such a machine is fully described in my U.S. Patent No. 3,072,003 filed on March 11, 1960, for "Punching Machines."

The riders acting like reference marks may either mechanically actuate switch contacts carried by the movable carriage or be so disposed as to block, cut or intersect the light beam in a photocell assembly consisting of a light source and a photocell carried by the movable carriage.

The essential objects of this invention is to provide a device for locking the movable carriage and therefore stop the workpiece during a certain time period after the braking or slowing down of the carriage has commenced, in order to avoid any detrimental fierce reaction on the carriage.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

Other objects and advantages will become apparent from the following description taken in conjunction with the accompanying drawings in which.

Figure 1:
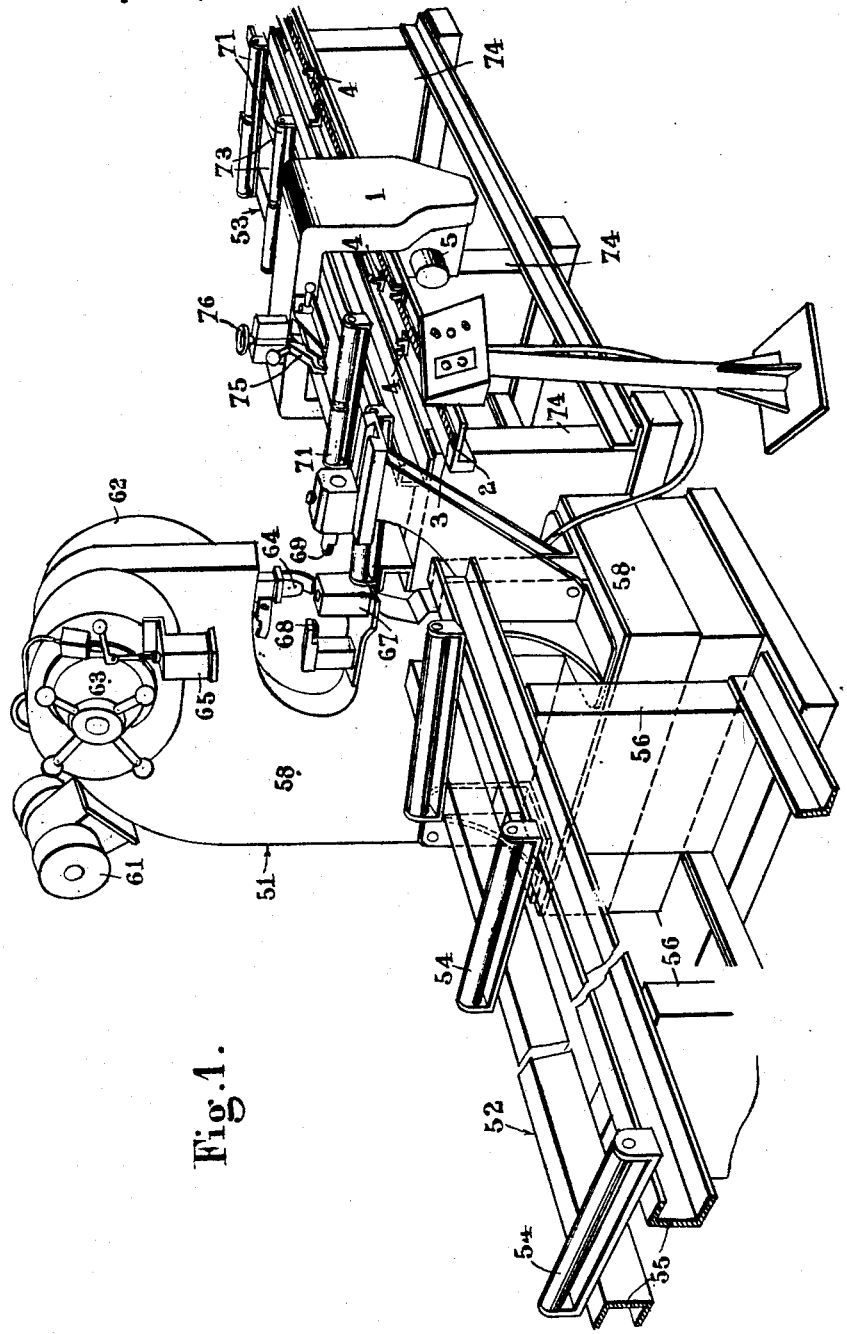
FIGURE 1 is a perspective view showing a punching machine comprising a single punching unit.

The automatic punching machine illustrated in FIGURE 1 of the drawings which is fully described in my copending application Ser. No. 14,404, Patent No. 3,072,003, comprises essentially a punching station designated in general by the reference numeral 51 and located between a first bed 52 for feeding the sections to the punching station, this bed being positioned before this station 51, and a working bed 53 positioned after this station 51. The sections to be punched are fed on the bed 52, they travel past the punching station 51 and then on the working bed from which they are subsequently taken or, if desired, returned in the opposite direction to the feed bed 52.

The feed bed 52 consists essentially of transverse rollers 54 supported by parallel longitudinal U-sectioned beams 55 bearing in turn on uprights 56.

The punching station 51 comprises essentially a frame 58 carrying a single punching unit of conventional design, that is, comprising a motor 61 driving a flywheel protected by a case 62 and adapted to drive in turn, through the medium of a one-revolution clutch 63, the vertical movements of the punch 64. An electromagnet 65 is adapted, when energized, to engage the clutch 63 in order to effect the punching operation proper, that is, the downward and upward strokes of the punch 64.

The frame 58 carries opposite the punch 64 a die 67 and, on either side of this die 67 and of the punch 64, lateral stops in the form of transverse wheels 68 and 69 are provided, the transverse position of these wheels 68, 69 being adjustable as a function of the width of the section to be punched by the machine.

The working bed 53 for the sections comprises a number of transverse rollers 71 on which the section is adapted to roll after the punching station.

The different rollers 71 of the working bed 53 are mounted on a pair of parallel, U-sectioned longitudinal beams 73 carried in turn by uprights 74. A side table 2 is carried by one of these beams 73. A carriage 1 is displaceable longitudinally in relation to the bed 53 by means of wheels not shown. The function of the carriage 1 is to carry along the sections in either direction. To this end, the carriage is provided with a motor 5 adapted, through a reducing gear (not shown), to drive a pinion in meshing engagement with a rack secured on the lower portion of the side table 2. A braking device of known type is also provided for stopping the motor 5 when the latter is de-energized.

A clamping device 75 is mounted on the movable carriage with the assistance of a slideway permitting a vertical adjustment thereof by means of a handwheel 76. This clamp 75 comprises a fixed lower jaw and a movable upper jaw pivoted on the lower jaw, the front edge of the section being clamped between the two jaws. The side table 2 carries a longitudinal graduated scale 3. Riders 4 are disposed on this table 2 at suitable space intervals corresponding, in the case of this punching machine, to the different spaced punching operations to be performed on the sections. These riders 4 are adapted to control the application of the carriage brakes in order to stop the movable carriage 1 by co-acting to this end with a photoelectric unit mounted on the carriage as shown for example at 19, 20, 21 and 22, 23, 24 in a diagrammatic form in FIG. 4.

The braking and locking process taking place upon completion of each necessary feed movement will be described more fully presently.

Figure 2:
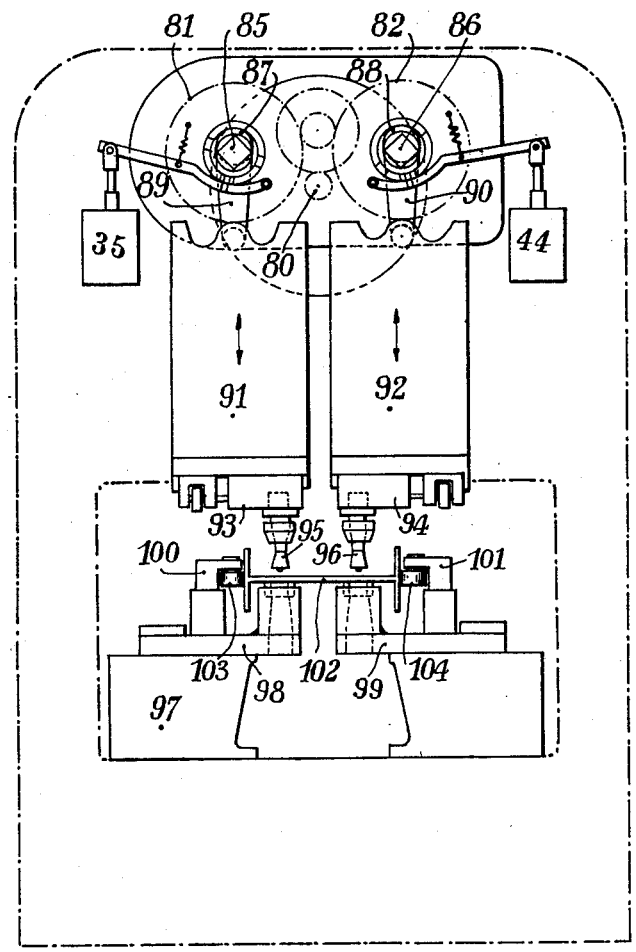
FIGURE 2 is an elevational view of the punching station of a punching machine comprising two punching units.

FIGURE 2 illustrates separately the punching station of a modified form of a known punching machine. In the example illustrated in FIGURE 2, the punching station comprises two identical punching units, but it will be readily understood that this number is not critical since more than two punching units may be provided in a single machine, according to needs.

Both punching units are driven from a central shaft 80 through separate reducing gears the output pinion of which is in meshing engagement with the toothed input wheels 81, 82 of the two punching units, respectively. These wheels 81, 82 are rigid with primary shafts of two dog clutches controlled by electromagnets 35, 44 respectively. These dog clutches are of any type already known per se and therefore their detailed description is not necessary. The secondary shafts 85, 86 of the dog clutches drive through eccentric members 87, 88 and connecting-rods 89, 90 the punch-carrying slides 91, 92 for reciprocating same vertically.

These slides 91, 92 are formed at their lower portion with a longitudinal groove adapted to receive one or more punch-holders such as 93, 94. The punches proper 95, 96 are adjustable transversely according to the desired relative spacing of the punched holes.

Secured on the frame 97 of the punching unit are die-holders 98, 99 co-acting respectively with the punches 95, 96 as shown. On the other hand, this frame 97 carries lateral guide means 100, 101.

In the example illustrated in FIGURE 2, the punching operation is carried out through the web 102 of an I-sectioned element having its wings guided by rollers 103 and 104.

This machine operates as follows: when during the travel of the carriage, the latter is stopped by a rider 4 (the form and arrangement of which will be described presently) one or both electromagnets 35, 44 is or are energized immediately thereafter. If both electromagnets 35, 44 are energized simultaneously, the punch-holding slides 91, 92 will be imparted simultaneously a reciprocating motion comprising a descending stroke and an ascending stroke, whereby the punches 95, 96 become operative. The section 102 is thus punched at two locations having the same longitudinal dimension. On the other hand, if only one electromagnet 35 or 44 is energized, only one punch 95 or 96 will be operative and the section is punched at only one location.

According to this invention, the movable carriage is locked in the punching position a certain time after the initial brake application.

Figure 3:
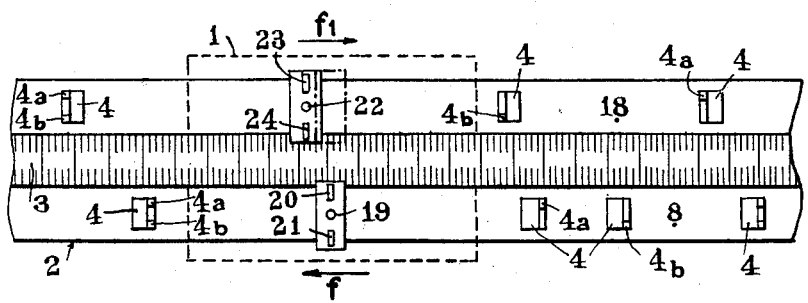
FIGURE 3 is a diagrammatic plane view illustrating the arrangement of the photoelectric unit with respect to the graduated scale carried by the working bench.

In FIG. 3 it will be seen that the movable carriage is equipped similarly with two carriage-stopping photoelectric units, that is, a first unit associated with a first track 8, formed alongside the aforesaid graduated scale 3, and comprising a light source 19 and photocells 20 and 21, and another unit associated with another track 18, formed on the other side of the graduated scale 3, and comprising the light source 22 and photocells 23, 24.

Figure 5:
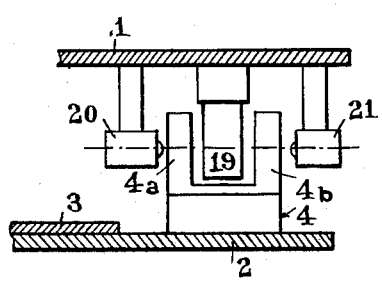
FIGURE 5 is an elevational view showing a photocell unit associated with a rider controlling the deceleration and locking of the carriage.
Figure 6:
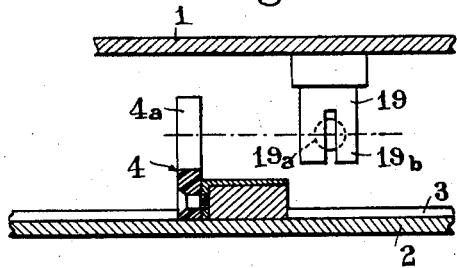
FIGURE 6 is a longitudinal sectional view of the same unit.

One of these photocell units is shown diagrammatically in FIGS. 5 and 6. The light source 19, consisting of a lamp 19a and a screen 19b formed with two vertical slots, is adapted to emit two opposite transverse light beams normally received by photocells 20 and 21. The two light beams are adapted to be blocked by the arms 4a and 4b of riders 4, respectively. Each rider comprises to this end either two arms 4a and 4b for controlling simultaneously the two punching electromagnets 35 and 44 (FIGS. 2 and 4) or only arm 4a for controlling the electromagnet 35 alone, or finally only arm 4b for controlling the other electromagnet 44 alone, as will be set forth more in details presently. Each cell associated with a punching station or device is adapted, when the light beam normally received by it is blocked, to control the carriage braking and locking cycle as well as a punching cycle to be performed by the punching station associated therewith.

Now, reference will be made to FIG. 4 to describe more fully the braking and locking cycle applied to the movable carriage 1 under the control of the photoelectric units 119-211 and 22-24.

In this figure it will be seen that the light sources 19 and 22 are energized from a common terminal through the medium of a reversing switch 28 actuated simultaneously with the contacts of the motor reversing switch 50 controlling the direction of rotation of the electromotor 5 and therefore the direction of motion of the movable carriage 1.

Figure 4:
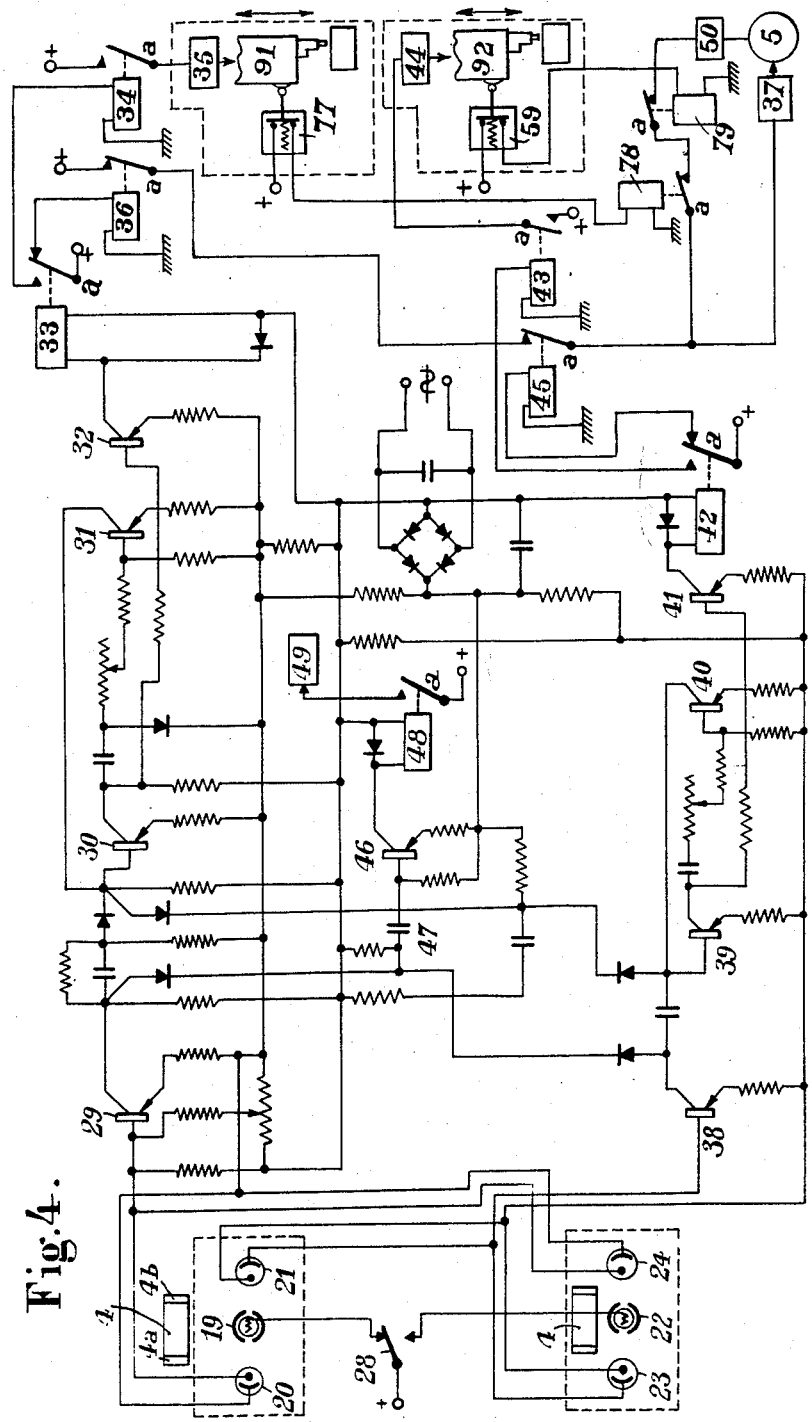
FIGURE 4 is a wiring diagram of the device for controlling the braking device associated with the movable carriage, the starting of the punching cycle and the locking of the carriage in the punching position.

When the carriage accomplishes its forward stroke or run, that is, in the direction of the arrow f of FIG. 3, contact 28 is in the position shown in FIG. 4 to energize the light source 19.

Under these conditions, during the forward stroke both cells 20 and 21 receive normally the light beams emitted from source 19 and the punching operations are initiated under the control of the riders 4 disposed on track 8.

When one rider 4 blocks with the arm 4a, the light beam normally received by the cell 20, the base electrode potential of input transistor 29 is lowered. Thus, a pulse is transmitted through an amplifying stage consisting of transistors 30, 31 and 32 to a relay 33 having a contact 33a inserted in the energizing circuit of another relay 34. This contact 34a controlling the energization of an electromagnet 35 releases the cycle of operation of the first punching station, that is, the movement of the punch-holding slide 91. On the other hand the front contact 33a in the position illustrated controls the energization of a relay 36 having a contact 36a in series on the one hand with the reversing device 50 and on the other hand with a brake electromagnet 37 associated with the motor 5. Therefore, when the blocking of the light beam normally received by the cell 20 begins, the transfer of contact 33a opens contact 36a and therefore causes on the one hand the circuit supplying energizing voltage to motor 5 through the reversing device to be broken, and on the other hand the winding of the brake electromagnet 37 to be energized. The change of position of contact 33a causes the energization of relay 34 and the resulting closing of contact 34a is attended by the energization of the electromagnet 35 of the first punching station. At this time, the punching cycle begins but only at the first punching station. In FIG. 4 it will be seen that in its inoperative position the slide 91 closes a contact 77 inserted in the circuit for energizing a relay 78 of which the front contact 78a is inserted in series in the circuit for energizing the carriage motor 5. Therefore, when the slide 91 begins to move downwards as a consequence of the energization of electromagnet 35, contact 77 opens, relay 78 is de-energized and contact 78a opens. Henceforth, the circuit for energizing the motor 5 is open. The contact 78a remains open during the complete punching cycle until the slide 91 resumes its inoperative position in which it closes the contact 77 again, thus re-energizing relay 78 and closing contact 78a. Under these conditions, the carriage motor 5 cannot be re-energized until the slide 91 has resumed its inoperative position.

If the rider 4 comprises two arms 4a and 4b, the arm 4b of rider 4 also intercepts the light beam normally received by photocell 21 and a similar sequence of operations takes place; in this case, transistors 38, 39, 40 and 41 will control the energization of relay 42. Thus, contact 42a of this relay, by moving to its front position, causes relay 43 to be energized and the corresponding contact 43a to close, whereby electromagnet 44 is energized to release the cycle of operation of the second punching station, that is, the movement of the punch-holding slide 92. On the other hand, the change of position of contact 42a de-energizes relay 45 and therefore opens contact 45a. It will be seen on FIGURE 4 that in its inoperative position the slide 92 closes a contact 59 inserted in the energizing circuit of a relay 79 of which the front contact 79a is inserted in turn in the circuit for energizing the motor 5 in series with contact 78a of relay 78. Therefore, when the slide 92 begins its downward stroke as a consequence of the energization of electromagnet 44, contact 59 opens, relay 79 is de-energized and contact 79a opens. Thus, the circuit for energizing the motor 5 is open. Contact 79a remains open during the complete punching cycle until the slide 92 resumes its inoperative position in which it recloses the contact 59, thus re-energizing the relay 79 and closing its contact 79a. Thus, the carriage motor 5 cannot be re-energized until the slide 92 has resumed its inoperative position.

Under these circumstances, it will be seen that, according as it is the arms 4a and/or 4b of rider 4 that blocks the light beam, the first and/or second punching stations will become operative, respectively.

The unit consisting of the light source 22 and photocells 23, 24 performs exactly the same sequence of steps during the return stroke or run of the carriage, that is, when contact 28 is actuated.

According to this invention the movable carriage is locked in the punching position only a certain time after the brake associated therewith has been actuated.

The circuit controlling the locking device comprises a transistor 46 having its base electrode connected through a capacitor 47 to the collector electrodes of transistors 29 and 38. The collector of transistor 46 is connected to a relay 48 having its front contact 48a inserted in the circuit for energizing the electromagnet 49 of the locking device, the latter being of any suitable and known type; therefore, it is not deemed necessary to show and describe this device in details, the same also applying to the braking system.

The operation of this locking device is as follows:

The capacitor 47 being normally charged, when a light beam normally received by any one of photocells 20, 21, 23 or 24 is blocked, a voltage increment takes place at the collector electrode of the relevant transistor 29 or 38. This voltage increase causes capacitor 47 to be discharged. At the same time the carriage brake is applied and when the operative photocell unit has overstepped the rider 4 during the deceleration resulting from this brake application the light beam is restored. At this time the transistor 29 or 38 is again blocked and therefore capacitor 47 is recharged.

As a result, a negative pulse develops on the base electrode of transistor 46 and causes relay 48 to be energized for a short period of time (about 0.25 seconds). The closing of contact 48a controls the energization of the locking device electromagnet 49. The latter will then actuate the locking device for stopping the movable carriage 1. Upon completion of the negative pulse applied to the base of transistor 46 (that is, after about 0.25 second) relay 48 is no more energized, as well as the electromagnet 49, and thus the locking device becomes inoperative. Under these conditions, the carriage is released but remains at a standstill throughout the punching period. Upon completion of this operation, the closing of contact 78a and/or 79a, as explained hereinabove, permits of re-energizing the motor 5 and re-starting the carriage.

As a consequence of this specific arrangement and operation the movable carriage is always locked at the end of the braking or deceleration run, so that the carriage is free from any undesired and detrimental shocks and jerks.

In FIG. 3, it will be seen that the photocell unit 22–24 is somewhat shifted longitudinally in relation to the other photocell assembly 19–21. The magnitude of this shift is twice the distance through which the movable carriage has travelled during the time period elapsing from the blocking of a light beam by a rider 4 to the actual carriage stopping. This is necessary owing to the fact that the braking runs takes place in two opposite directions when the punching is performed successively during the forward and backward strokes.

Since, on the other hand, certain works do not require punching steps during the return stroke of the movable carriage, the photocell unit 22–24 may be utilized during the forward stroke by suppressing the longitudinal shift in relation to the other photocell unit 19–21.

This can easily be done by mounting the assembly 22–24 on a slide displaceable along the desired distance by means of a control lever. FIG. 3 illustrates in chain-dotted lines the position of this assembly when it is operative also during the forward stroke. In this case the two photocell assemblies are operated by turns for each complete to and fro movement. With this arrangement it is possible to provide a different program on tracks 8 and 18.

Of course, the movable carriage control device described hereinabove and illustrated in the accompanying drawings is also applicable to other machines other than punching machines, notably to drilling or boring machines, whether of the single- or multi-spindle type, to welding machines and also to any machine performing operations at predetermined and/or space intervals on elongated workpieces.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What I claim is:

1. Device for controlling the feed of a workpiece to be machined at a machining station, notably in punching machines, which comprises a working bed, a movable carriage for causing the workpiece to travel past said machining station on said bed, an electromotor for imparting a movement of translation to said movable carriage, braking means carried by said movable carriage for decelerating said movable carriage, locking means carried by said movable carriage for stopping said movable carriage, riders acting as reference marks which are disposed on the path of said movable carriage at a relative spacing corresponding to those contemplated between the successive machining steps to be performed on the workpiece, at least one photoelectric unit for stopping said carriage, said photoelectric unit being carried by said carriage and comprising a light source and a photocell receiving the light beam emitted from said light source, said riders being disposed so that they intersect the path of said light beam, electrical circuit means connected to said photoelectric unit, said electrical circuit means being adapted to deliver a first electrical pulse when the light beam of said photoelectric unit is blocked up by a rider, and a second electrical pulse when the blocking of the light beam is removed, first switching means energized by said first pulse for causing said electromotor to be de-energized and said braking means to be actuated for decelerating said carriage, and second switching means energized by the second pulse for controlling the actuation of said locking means and consequently the stopping of said movable carriage.

2. Device as set forth in claim 1 wherein said braking means comprise a brake-actuating electromagnet, said locking means comprise a carriage locking electromagnet and said electrical circuit means comprise a transistorized amplifier having its inlet connected to the photoelectric cell of said photoelectric unit, a first relay connected to the output of said amplifier, said first relay controlling both the de-energization of said electromotor and the energization of said brake-actuating electromagnet, a normally blocked transistor, a coupling capacitor disposed between the input of said transistor and the output of said transistorized amplifier, and a second relay connected to the output of said transistor and controlling the energization of said carriage locking electromagnet.

References Cited by the Examiner
UNITED STATES PATENTS

| | | | |
|---|---|---|---|
| 2,628,680 | 2/53 | Seybold | 83—416 |
| 2,729,447 | 1/56 | Groll | 226—33 |
| 2,737,158 | 3/56 | Seybold | 83—365 |
| 2,738,007 | 3/56 | Power | 83—209 |
| 2,884,852 | 5/59 | Saltz | 226—9 |
| 2,966,086 | 12/60 | Sjostrom | 83—371 |
| 2,983,357 | 5/61 | Estrems | 226—9 |

SAMUEL F. COLEMAN, *Primary Examiner.*

EDWARD C. ALLEN, RAPHAEL M. LUPO, *Examiners.*